S. P. GRAHAM.

Improvement in Carriage Seats.

No. 124,433.  Patented March 12, 1872.

Attest.
Philip M. Shung
J. Trohig.

Inventor.
Simon P. Graham,
per. Fisher and Fisher,
his Attorneys.

UNITED STATES PATENT OFFICE.

SIMON P. GRAHAM, OF LONDON, CANADA, ASSIGNOR TO THEODORE COMSTOCK, EZRA BOOTH, AND HENRY F. BOOTH, OF COLUMBUS, OHIO.

IMPROVEMENT IN CARRIAGE-SEATS.

Specification forming part of Letters Patent No. 124,433, dated March 12, 1872.

I, SIMON P. GRAHAM, of the town of London, in the province of Ontario and Dominion of Canada, have invented certain new and useful Improvements in Carriage-Seats, of which the following is a specification:

My invention relates to the combination of lugs with a sheet-metal seat in such a manner that the lugs will support the rim at those points where a carriage-top is attached to said rim. By this invention I am enabled to make the rim aforesaid with more expedition and at a less cost than a rim with a fillet, and at the same time preserve the strength of the rim.

Figure 1:
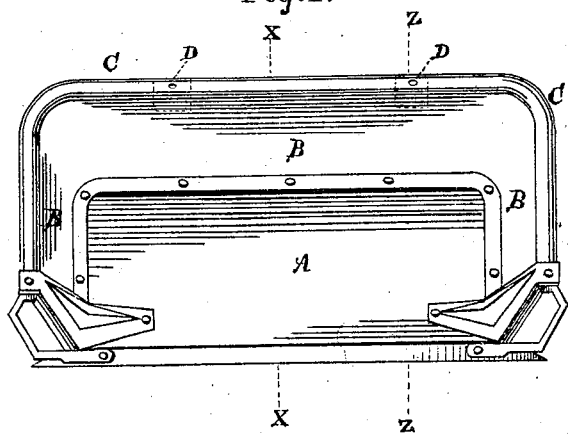
Figure 2:
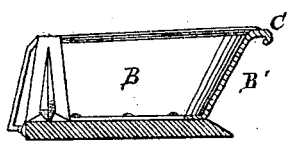
Figure 3:
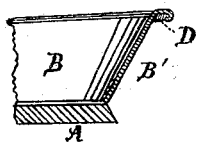

In the accompanying drawing, Figure 1 is a plan view of a carriage-seat embodying my inventions. Fig. 2 is a vertical transverse section of same made at the dotted line $x\ x$ in Fig. 1. Fig. 3 is a vertical transverse section of the same made at the dotted line N N of Fig. 1.

General Description.

A is the bottom of the seat. B B' B are the back and sides of the seat. This back and sides are usually made of one continuous piece of metal; but may, if desired, be made in several pieces attached together by any of the ordinary methods. Upon the top of the back and sides is a rim, C, projecting at first horizontally outward from the back and sides, and then curling under sufficiently to give it the requisite stiffness. I vary the degree of the curl, or bend, or deflection of the rim according to the thickness of the metal of which the rim is composed and the lateral strength I desire to give the rim. I claim as my invention, the right to deflect, bend, or curl the rim little or much, as experience may dictate, for the purpose of giving lateral stiffness to the rim. This rim may be upon the sides and back, or upon the sides alone, or the back alone. At present I prefer to make the rim continuous around both sides and back. In order to prevent any breaking, bending, or warping of the rim, when a top is attached to the seat, I usually place lugs D D, &c., under and against the rim at those places whereto bows, uprights, or other frame-work are attached.

By these improvements I secure a substantial, cheap, and easily-made rim at the upper edge of the back and sides of the seat.

What I claim as new is—

1. The combination of the flange C, when made as described, and one or more lugs, D D, &c., substantially as and for the purpose set forth.

2. In combination with the flange C, when made as described, one or more lugs, D D, &c., and the seat-back and sides, substantially as and for the purposes specified.

SIMON P. GRAHAM.

Witnesses:
   E. E. SHEPPARD,
   JNO. J. BROWN.